May 20, 1947.  G. R. COSS  2,420,866
COUPLING FOR SUCTION CLEANERS
Filed April 21, 1944
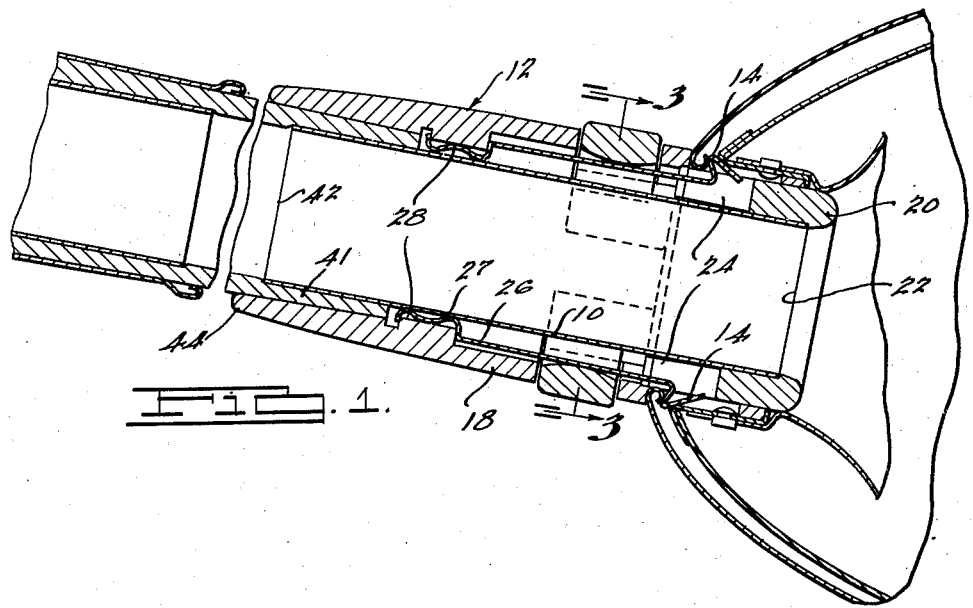
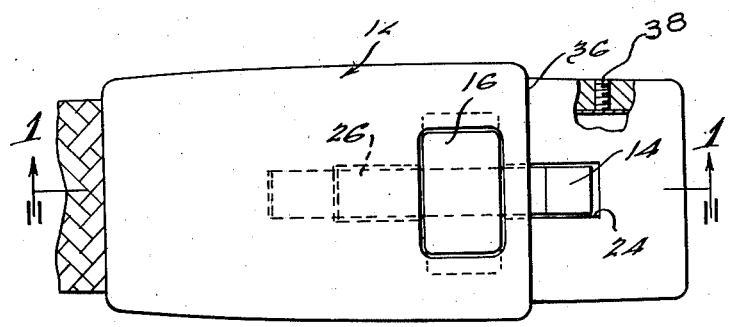
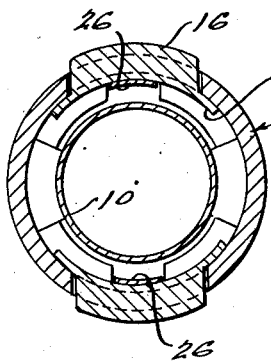
INVENTOR.
George R. Coss.
BY
Edwin J. Balluff
ATTORNEY.

Patented May 20, 1947

2,420,866

UNITED STATES PATENT OFFICE 2,420,866

COUPLING FOR SUCTION CLEANERS

George R. Coss, Detroit, Mich., assignor to Eureka Williams Corporation, a corporation of Michigan Application April 21, 1944, Serial No. 532,150

6 Claims. (Cl. 285—174)

This invention relates to a coupling for suction cleaners and has particular reference to a coupling member which is efficient in operation and simple in construction.

A principal object of the invention is to provide a new and improved coupling which is particularly adapted for use on the end of a flexible hose for quickly attaching and detaching the same from a vacuum cleaner.

Other objects and advantages of the invention will be apparent from a consideration of the following specification taken in conjunction with the accompanying drawings, of which there is one sheet and wherein:

Fig. 1 is a longitudinal sectional view of a device embodying the invention and taken generally along the line 1—1 of Fig. 2;

Fig. 2 is a plan view of the same; and

Fig. 3 is a section taken along the line 3—3 of Fig. 1.

In general the coupling embodying the invention comprises an inner metallic tubular air conducting member 10, an outer tubular shell 12, a pair of latches 14, and buttons 16 for releasing the latches.

The shell 12 may be provided by cylindrical plastic moldings 18 and 20 arranged in line and united together. The interior of the shell 12 is formed to receive with a slip fit the tubular member 10 with one edge thereof fitting into an annular seat 22 at one end of the coupling. The shell 12 is formed to provide a pair of oppositely disposed axially extending slots 24 which at one end of the coupling are open or uncovered. Each of the latches 14 may be formed on one end of a leaf spring 26. Each spring 26 is arranged in one of the slots 24 and with the latch 14 thereof projecting radially outwardly beyond the outer surface of the shell 12 through the open end of a slot 24 for engagement with an annular shoulder formed, for example, in a socket in the end of a tank type vacuum cleaner.

The other ends of the springs 26 are formed in the shape of a U 27 to fit around internal bosses 28 formed on the shell 12 and to be confined between such bosses 28 and the outer surface of the tubular member 10 for anchoring the springs 26 in position. The U 27 is bowed in the middle in order to urge latch 14 outwardly and so as to take up the clearance between boss 28 and the outside of tube 10.

The buttons 16 are arranged in transversely extending slots in the shell 12 and project radially therefrom. The inner side of the buttons bears against the leaf springs 26 intermediate of the anchored end thereof and the latches 14. The buttons 16 are provided with laterally extending flanges 32 which cooperate with the inside of the shell 12 on opposite sides of slots 24 so as to retain the buttons in their assembled position.

The members 18 and 20 are arranged so that the edges thereof are in abutting relationship and they may be cemented together. The other end of the coupling is provided with annular space between the tube 10 and the shell 12 for receiving an end of a flexible hose 41 or other conduit. The end 42 of the tubular member 10 is arranged so as to terminate inwardly from the end 44 of the shell 12 so that when the hose 41 is flexed or bent relative to the coupling, such end 42 of the tubular member 10 will not tend to cut or injure the inside of the hose 41.

To limit the penetration of the coupling into its socket, an annular shoulder 36 is formed on shell 12 for cooperation with the edge of the socket. A drive screw 38 may be driven into shell 12 for engagement with member 10 to prevent separation thereof.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A detachable male coupling member comprising a tubular plastic shell having an internal annular shoulder adjacent one end thereof, an inner metallic tubular member fitted in said shell and seated against said shoulder, said shell and member cooperating to define an air conducting passage, means cooperable with said shell and tubular member to prevent separation thereof, said shell being formed so as to provide an axially extending slot exteriorly of said tubular member, a spring member arranged in said slot, one end of said spring member being anchored by and between said shell and tubular member and the other end of said spring member being formed as a latch, said shell having an opening at one end thereof through which said latch projects outwardly of the surface of said shell, said outwardly projecting end of said spring member forming a latch for engagement with a shoulder provided by a socket with which said coupling is adapted to be associated, said shell having an external shoulder rearwardly of said latch for limiting the penetration of said male coupling member into its socket, and means accessible from the exterior of said shell for depressing said latch.

2. A detachable male coupling member comprising a tubular plastic shell, an inner metallic tubular air conducting member of substantially uniform cross section fitted in said shell, means cooperable with said shell and tubular member to prevent separation thereof, said shell being formed so as to provide an axially extending slot exteriorly of said tubular member, a spring member arranged in said slot, one end of said spring member being anchored by and between said shell and tubular member and the other end of said spring member being formed as a latch, said shell having an opening at one end thereof through which said latch projects outwardly of the surface of said shell, said outwardly projecting end of said spring member forming a latch for engagement with a shoulder provided by a socket with which said coupling is adapted to be associated, and means accessible from the exterior of said shell for depressing said latch.

3. A detachable male coupling member comprising a tubular plastic shell, an inner metallic tubular air conducting member fitted in said shell, means cooperable with said shell and tubular member to prevent separation thereof, said shell being formed so as to provide an axially extending slot exteriorly of said tubular member, a spring member arranged in said slot, means cooperable with one end of said spring member for anchoring the same in said slot, the other end of said spring member being provided with a latch, said shell having an opening at one end thereof through which said latch projects outwardly for engagement with a shoulder provided by a socket with which said coupling is adapted to be associated, and means accessible from the exterior of said shell for depressing said latch comprising a button seated on said spring intermediate its ends.

4. A detachable male coupling member comprising a tubular shell, an inner metallic tubular air conducting member fitted in said shell, means cooperable with said shell and tubular member to prevent separation thereof, said shell being formed so as to provide an axially extending slot exteriorly of said tubular member, a spring member arranged in said slot, one end of said spring member being U-shaped, said shell having a boss for receiving said U-shaped end for holding the same against said tubular member, and the other end of said spring member being provided with a latch, said shell having an opening at one end thereof through which said latch projects outwardly for engagement with a shoulder provided by a socket with which said coupling is adapted to be associated.

5. A detachable male coupling member comprising a tubular shell, an inner metallic tubular air conducting member fitted in said shell, means cooperable with said shell and tubular member to prevent separation thereof, said shell being formed so as to provide an axially extending slot exteriorly of said tubular member, a spring member arranged in said slot, one end of said spring member being U-shaped, said shell having a boss for receiving said U-shaped end for holding the same against said tubular member, said part of the U-shaped end of said spring confined between said boss and tubular member being bowed between the legs thereof, and the other end of said spring member being formed as a latch, said shell having an opening at one end thereof through which said latch projects outwardly of the surface of said shell, said outwardly projecting end of said spring member forming a latch for engagement with a shoulder provided by a socket with which said coupling is adapted to be associated, and means accessible from the exterior of said shell for depressing said latch.

6. A detachable male coupling member comprising a tubular plastic shell having an internal annular shoulder adjacent one end thereof, an inner metallic tubular member fitted in said shell and having one end seated against said shoulder, means cooperable with said shell and tubular member to prevent separation thereof, the other end of said tubular member terminating short of the other end of said shell and cooperating therewith to provide an annular space for receiving a flexible hose to which said coupling is secured, said shell and member cooperating to define an air conducting passage, said shell being formed so as to provide an axially extending slot exteriorly of said tubular member, a spring member arranged in said slot, one end of said spring member being anchored by and between said shell and tubular member and the other end of said spring member being formed as a latch, said shell having an opening at one end thereof through which said latch projects outwardly of the surface of said shell, said outwardly projecting end of said spring member forming a latch for engagement with a shoulder provided by a socket with which said coupling is adapted to be associated, said shell having an external shoulder rearwardly of said latch for limiting the penetration of said coupling into its socket.

GEORGE R. COSS.

REFERENCES CITED

The following references are of record in the file of this patent:

UNITED STATES PATENTS

| Number | Name | Date |
| --- | --- | --- |
| 2,064,397 | White | Dec. 15, 1936 |
| 2,212,679 | White | Aug. 27, 1940 |